United States Patent [19]
Wilson

[11] Patent Number: 6,074,148
[45] Date of Patent: Jun. 13, 2000

[54] WHEELNUT/CAP ASSEMBLY WITH INSULATING WASHER

[75] Inventor: Larry J. Wilson, Commerce Township, Mich.

[73] Assignee: Industrial & Automotive Fasteners, L.L.C., Royal Oak, Mich.

[21] Appl. No.: 09/031,437

[22] Filed: Feb. 26, 1998

Related U.S. Application Data

[60] Provisional application No. 60/040,110, Mar. 7, 1997.

[51] Int. Cl.[7] ............................. F16B 19/00; F16B 33/00; F16B 37/14

[52] U.S. Cl. .......................... 411/430; 411/375; 411/533; 411/542

[58] Field of Search ................................. 411/369, 375, 411/429, 430, 431, 533, 542

[56] References Cited

U.S. PATENT DOCUMENTS

| | | | |
|---|---|---|---|
| 1,727,590 | 9/1929 | Ferry | 411/430 |
| 4,460,300 | 7/1984 | Bettini et al. | 411/542 X |
| 4,764,070 | 8/1988 | Baltzell et al. | 411/430 |
| 4,944,644 | 7/1990 | Bell | 411/375 X |
| 5,772,377 | 6/1998 | Bydalek | 411/375 X |

*Primary Examiner*—Neill Wilson
*Attorney, Agent, or Firm*—Harness, Dickey & Pierce, P.L.C.

[57] ABSTRACT

An improved capped wheelnut of the type including a nut body having a central threaded aperture and a pair of ends, one end being adapted to engage a wheel, and a cap for said nut body at the other end. The cap has an end wall and a continuous side wall which terminates intermediate the ends of said nut body in an annular edge, an insulating washer constructed of material having low heat conductivity, said washer being of annular ring shape and positioned on said nut adjacent the lower end of said cap, a portion of said cap being engaged with said washer so as to maintain said washer in engagement with said nut body so that it will not fall off the nut.

1 Claim, 1 Drawing Sheet

WHEELNUT/CAP ASSEMBLY WITH INSULATING WASHER

This application claims benefit of U.S. Provisional Application Ser. No. 60/040,110, filed Mar. 7, 1997.

BACKGROUND OF THE INVENTION

This invention relates generally to wheelnut/cap assemblies of the type illustrated in U.S. Pat. No. 4,813,835 assigned to the owner of this invention and more particularly to such an assembly with an integral washer for insulating the wheel cover from the wheelnut.

The use of plastic trim components on wheel assemblies offers significant cost reduction over metal components. Plastics also make possible intricate designs either not feasible or too costly to implement with metal components. Consequently, designs utilizing plastic wheel covers or hub caps have proliferated among the automobile manufacturers and their suppliers. Methods of attachment to the wheel vary, using some metal components integral with the cover to provide attachment directly to the wheel or by means of the wheel nuts (referred to as "bolt-on" design.) Attachment of the cover with wheelnuts has proven to be the most cost effective method of attachment. However, it also places the most constraints on styling design. This is due to the heat generated by the brake rotor. Lack of ventilation or heat sinking can cause distortion of the plastic cover, resulting in looseness and noise and/or cosmetic damage. In the case of bolt-on designs, this heat has a direct path through the wheel stud, to the wheelnut, and into the plastic cover.

This invention effectively deals with the heat issue in the bolt-on design by using a plastic washer to insulate the cover from the wheelnut. This invention is a low cost method of achieving attachment of the washer to the wheelnut.

SUMMARY OF THE INVENTION

This invention consists of a three component assembly. First, an inner component, namely, a nut, that serves the traditional purpose of wheel attachment and additional features for accommodating the attachment of a second component, a washer made of plastic, nylon, or some other material of low heat conductivity. The third component is a cap appropriately complementing the nut geometry and engaging the outer diameter of the washer so as to retain it on the nut. This cap is "crimped" or mechanically compressed to hold the washer sufficiently so as to prevent it from falling off the assembly. The preferred cap material in this case is stainless steel, but other metals or metal alloys can be used. The attachment of the cap to the nut can be varied, utilizing welding, bonding with adhesive, soldering, etc.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
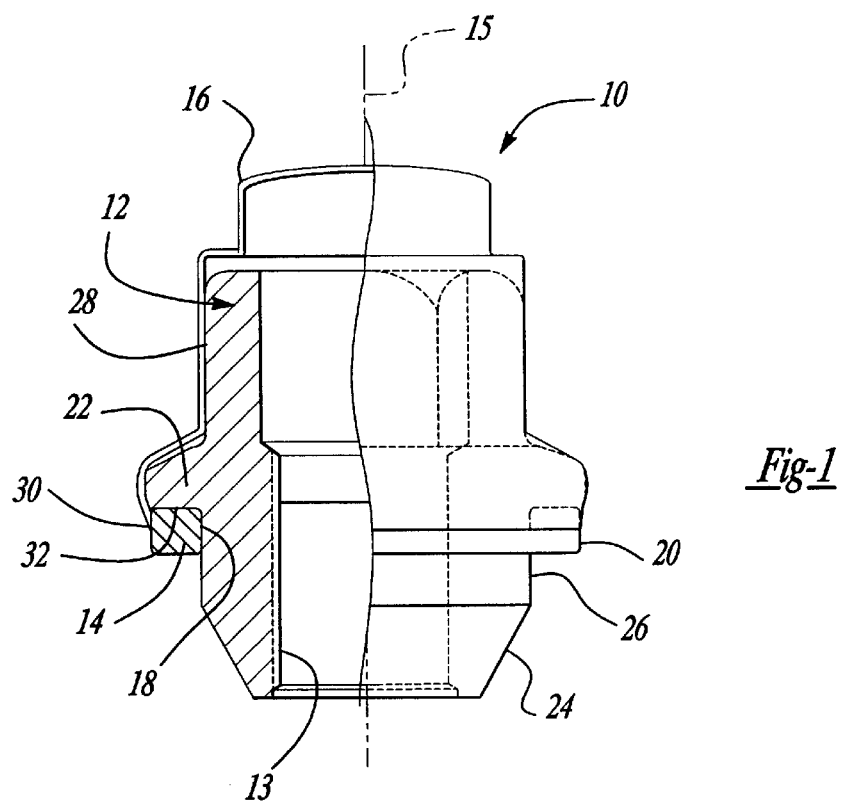
FIG. 1 is a elevational view of the capped wheelnut of this invention, with parts broken away and shown in section.
Figure 2:
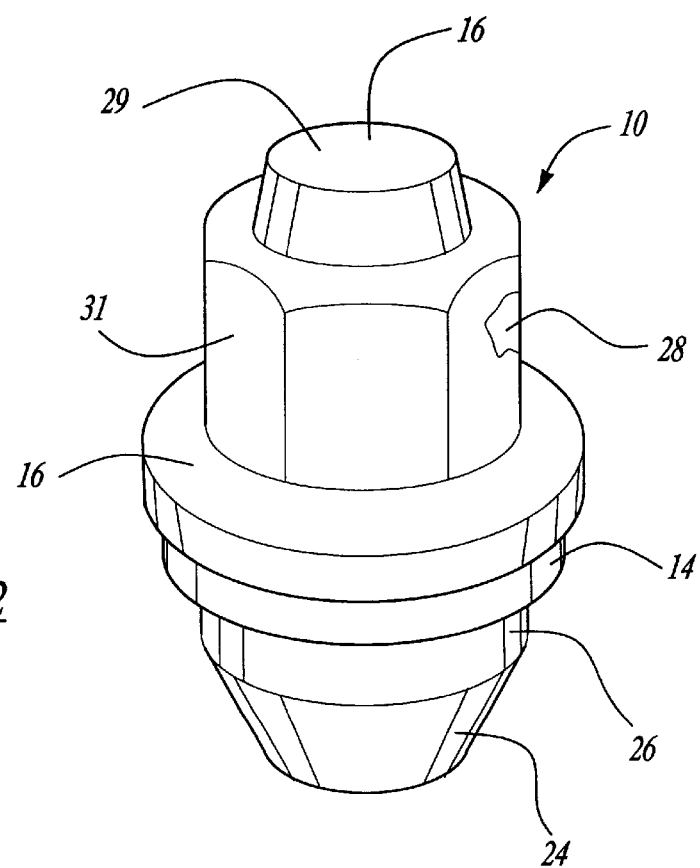
FIG. 2 is a perspective view of the capped wheelnut of this invention.

With reference to the drawing, the capped wheelnut assembly of this invention, indicated at 10, is of the general type shown in U.S. Pat. No. 4,813,835 and includes a nut 12 having a threaded aperture 13 and a longitudinal axis 15. The assembly 10 also includes a washer 14 and a cap 16.

The nut 12 serves the traditional purpose of wheel attachment and additional features for accommodating the washer 14 and the cap 16. The washer 14 is made of plastic, nylon, or other material of low heat conductivity. The washer 14 is of annular ring shape having an inner diametrical side 18 and an outer diametrical side 20.

The nut 12 consists of a metal body 22 having an inner end terminating in a conical surface 24 that is adapted to mate with the conical depressions typically formed around stud holes in vehicle wheels. The conical section 24 terminates in a short cylindrical land 26. The land 26 in turn terminates in an annular surface 32 which extends radially outwardly of the axis 15 and locates the washer 14 where it will insulate a plastic cover from the high heat of the nut body 22.

The nut body 12 at its outer end also has a plurality of wrench flats 28 arranged generally parallel to the axis 15 of the nut body. It is conventional to provide six such wrench flats and thus in an end view the nut body is of hexagonal configuration.

The cap 16, in addition to performing its ornamental function and its function of protecting the wheelnut 12, appropriately complements the nut geometry and extends at its lower end to a position in which it engages the outer side 20 of the washer 14. The cap 16 is crimped or mechanically compressed to hold the washer 14 sufficiently so as to prevent it from falling off the assembly. More particularly, the cap 16 has an end wall 29 and a continuous side wall 31 which terminates in an annular edge 30. The edge 30 engages the washer 14 so that the washer 14 is clamped between the cap edge 30 and the land 26.

The cap 16 is preferably made of stainless steel but can be made from other metals or metal alloys. The cap 16 is firmly secured to the nut 12 by welding, bonding with adhesive, solder, or the like (not shown).

Due to the heat generated by the wheel brake rotor, and the fact that this heat has a direct path through the wheel stud to the wheelnut, any plastic wheel cover is subject to deformation. In the present case, the washer 14 functions to insulate the nut 12 from the wheel cover (not shown) which is associated with the motor vehicle wheel (not shown) which is being secured to the vehicle by the wheelnut 10.

It is to be understood that the invention is not limited to the exact construction illustrated and described above, but that various changes and modifications may be made without departing from the spirit and scope of the invention as defined in the following claims.

What is claimed is:

1. An improved capped wheelnut assembly for use in environs wherein the wheelnut can become hot enough to endanger related wheel parts such as a wheel cover, said improved capped wheelnut being of the type including a nut body having a central threaded aperture and a pair of ends, one end being adapted to engage a wheel, said end terminating in a conical surface, said conical surface terminating in a short cylindrical land, said land in turn terminating in an annular surface which extends radially of said nut body, and a cap for said nut body having an end wall and a continuous side wall which terminates intermediate said ends of said nut body in an annular edge, an insulating washer constructed of material having low heat conductivity, said washer being of annular ring shape and positioned on said annular surface and said land adjacent the lower end of said cap, said annular edge of said cap being engaged with said washer so as to clamp said washer against said land so that said washer will not fall off the nut body and heat from the wheelnut will be dissipated in said washer.

* * * * *